United States Patent
Tandon et al.

(10) Patent No.: US 11,982,833 B2
(45) Date of Patent: May 14, 2024

(54) DISPERSION COMPENSATION FIBER AND DISPERSION COMPENSATION MODULE

(71) Applicant: CORNING INCORPORATED, Corning, NY (US)

(72) Inventors: Pushkar Tandon, Painted Post, NY (US); Sergey Yurevich Ten, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 39 days.

(21) Appl. No.: 17/702,896

(22) Filed: Mar. 24, 2022

(65) Prior Publication Data
US 2022/0317367 A1    Oct. 6, 2022

Related U.S. Application Data

(60) Provisional application No. 63/167,975, filed on Mar. 30, 2021.

(51) Int. Cl.
*G02B 6/02* (2006.01)
*G02B 6/028* (2006.01)
*G02B 6/44* (2006.01)

(52) U.S. Cl.
CPC ......... *G02B 6/02261* (2013.01); *G02B 6/028* (2013.01); *G02B 6/4457* (2013.01)

(58) Field of Classification Search
CPC .................................................. G02B 6/02261
See application file for complete search history.

(56) References Cited

U.S. PATENT DOCUMENTS

| 7,061,657 B1 * | 6/2006 | Fishman | H04J 14/02 398/79 |
| 2003/0053780 A1 * | 3/2003 | Zhang | G02B 6/0228 385/127 |

(Continued)

FOREIGN PATENT DOCUMENTS

| EP | 1130828 A2 | 9/2001 |
| EP | 2211211 A1 | 7/2010 |
| WO | 2003/007035 A2 | 1/2003 |

OTHER PUBLICATIONS

International Search Report and Written Opinion of the International Searching Authority; PCT/US2022/021836; dated Jul. 4, 2022, 18 pages; European Patent Office.

(Continued)

*Primary Examiner* — Chris H Chu
(74) *Attorney, Agent, or Firm* — Yiqun Zhao

(57) ABSTRACT

In some embodiments, an optical fiber transmission link, includes a length of dispersion compensating fiber (DCF), the dispersion compensating fiber coupled to a length of single-mode fiber (SMF) having a zero dispersion wavelength of 1300 nm to 1324 nm; wherein the optical fiber transmission link comprising the dispersion compensating fiber coupled to the single-mode fiber and operating at wavelengths between 1265 nm and 1375 nm increases maximum link lengths of the optical fiber transmission link by more than 60% as compared to the link length of the optical fiber transmission link with the single-mode fiber only; and wherein the maximum link length is calculated from the maximum allowed positive and negative accumulated dispersion at wavelengths between 1265 nm and 1375 nm.

20 Claims, 14 Drawing Sheets

(56) References Cited

U.S. PATENT DOCUMENTS

| | | | |
|---|---|---|---|
| 2004/0101263 A1* | 5/2004 | Zhang | G02B 6/03677 |
| | | | 385/127 |
| 2005/0286849 A1* | 12/2005 | Bickham | G02B 6/02004 |
| | | | 385/127 |
| 2019/0349085 A1 | 11/2019 | Parsons et al. | |
| 2021/0288718 A1* | 9/2021 | Wang | H04B 10/503 |

OTHER PUBLICATIONS

Invitation to Pay Additional Fees and, Where Applicable, Protest Fee; PCT/US2022/021836; dated Jun. 8, 2022, 09 pages; European Patent Office.

* cited by examiner

DISPERSION COMPENSATION FIBER AND DISPERSION COMPENSATION MODULE

CROSS-REFERENCE TO RELATED APPLICATIONS

This application claims the benefit of priority under 35 U.S.C. § 120 of U.S. Application Ser. No. 63/167,975, filed on Mar. 30, 2021, the content of which is relied upon and incorporated herein by reference in its entirety.

FIELD

The present disclosure pertains to optical fibers. More particularly, the present disclosure relates to dispersion compensating modules and dispersion compensating optical fibers useable therewith.

BACKGROUND

Front haul transmission is becoming important in 5G systems. These systems have bit rates greater than or equal to 25 GBps and target greater than 9 kms reach using 12 wavelength channels between 1267.5 nm and 1374.5 nm. However, chromatic dispersion limits the link length in these O-band transmission systems. While the link length can be improved by having more expensive externally modulated lasers, such a solution adds to the cost of the system. Alternatively, optical fibers that are optimized for chromatic dispersion for O-band performance have been suggested. However, such fibers are not standards compliant and particularly have zero dispersion wavelengths higher than 1350 nm. Instead, standard single mode fibers (SMF) are used in such systems. However, the lengths of standard SMF fibers are limited to about 5.4 kms due to chromatic dispersion constrains.

Accordingly, the inventors have developed improved dispersion compensating modules and dispersion compensating optical fibers useable therewith.

SUMMARY

A first embodiment of the present disclosure includes an optical fiber transmission link, wherein the optical fiber transmission link includes: a length of dispersion compensating fiber (DCF) comprising: a central core region having an outer radius r1 of 1.5 μm to 2 μm, and a maximum refractive index Δ1 of 1.15% to 1.6%, and a cladding region comprising (i) a first inner cladding (trench) region, surrounding the central core, having a refractive index Δ2 of −0.3% to −0.45% and an having an outer radius r2 of 5 μm to 7 μm, (ii) a second inner cladding (ring) region, surrounding the first inner cladding region, having a refractive index Δ3 of 0.35% to 0.5% and a radius r3 of 6 μm to 8 μm, and (iii) an outer cladding region, surrounding the second inner cladding region, wherein the DCF exhibits a cable cutoff of less than 1260 nm and a mode field diameter at 1310 nm of greater than 4 microns; the dispersion compensating fiber coupled to a length of single-mode fiber (SMF) having a zero dispersion wavelength of 1300 nm to 1324 nm; wherein the optical fiber transmission link comprising the dispersion compensating fiber coupled to the single-mode fiber and operating at wavelengths between 1265 nm and 1375 nm increases maximum link lengths of the optical fiber transmission link by more than 60% as compared to the link length of the optical fiber transmission link with the single-mode fiber only; and wherein the maximum link length is calculated from the maximum allowed positive and negative accumulated dispersion at wavelengths between 1265 nm and 1375 nm.

A second embodiment of the present disclosure may include the first embodiment, wherein the optical fiber transmission link comprising the dispersion compensating fiber coupled to the single-mode fiber and operating at wavelengths between 1265 nm and 1375 nm increases link lengths of the optical fiber transmission link by more than 70% as compared to the link length of the optical fiber transmission link with the single-mode fiber only.

A third embodiment of the present disclosure may include the first embodiment, wherein the optical fiber transmission link comprising the dispersion compensating fiber coupled to the single-mode fiber and operating at wavelengths between 1265 nm and 1375 nm increases link lengths of the optical fiber transmission link by more than 80% as compared to the link length of the optical fiber transmission link with the single-mode fiber only.

A fourth embodiment of the present disclosure may include the first embodiment, wherein the length of the link length is greater than 8 km.

A fifth embodiment of the present disclosure may include the first embodiment, wherein the length of the link length is greater than 8.5 km.

A sixth embodiment of the present disclosure may include the first embodiment, wherein the length of the link length is greater than 9 km.

A seventh embodiment of the present disclosure may include the first embodiment, wherein the minimum allowable accumulated dispersion of the optical fiber transmission link is −58.7 ps/nm and the maximum allowable accumulated dispersion of the optical fiber transmission link is 33.1 ps/nm.

An eighth embodiment of the present disclosure may include the first embodiment, wherein the ratio of the length of the dispersion compensating fiber to the length of the single mode fiber is between 0.005 and 0.05.

A ninth embodiment of the present disclosure may include the first embodiment, wherein the dispersion compensating fiber exhibits a dispersion at 1265 nm of −150 ps/nm/km to −50 ps/nm/km.

A tenth embodiment of the present disclosure may include the first embodiment, wherein the dispersion compensating fiber exhibits a chromatic dispersion slope at 1265 nm of −2.6 ps/nm$^2$/km to −0.03 ps/nm$^2$/km.

An eleventh embodiment of the present disclosure may include the first embodiment, wherein the dispersion compensating fiber exhibits a dispersion at 1290 nm of −250 ps/nm/km to −50 ps/nm/km.

A twelfth embodiment of the present disclosure may include the first embodiment, wherein the dispersion compensating fiber exhibits a chromatic dispersion slope at 1290 nm of −5.5 ps/nm$^2$/km to −0.05 ps/nm$^2$/km.

A thirteenth embodiment of the present disclosure may include the first embodiment, wherein the dispersion compensating fiber exhibits a dispersion at 1310 nm of −375 ps/nm/km to −50 ps/nm/km.

A fourteenth embodiment of the present disclosure may include the first embodiment, wherein the dispersion compensating fiber exhibits a chromatic dispersion slope at 1310 nm of −6.5 ps/nm$^2$/km to −0.01 ps/nm$^2$/km.

A fifteenth embodiment of the present disclosure may include the first embodiment, wherein the dispersion compensating fiber exhibits a dispersion at 1330 nm of −460 ps/nm/km to −50 ps/nm/km.

A sixteenth embodiment of the present disclosure may include the first embodiment, wherein the dispersion compensating fiber exhibits a chromatic dispersion slope at 1330 nm of −9 ps/nm$^2$/km to −0.08 ps/nm$^2$/km.

A seventeenth embodiment of the present disclosure may include the first embodiment, wherein the dispersion compensating fiber exhibits a dispersion at 1350 nm of −550 ps/nm/km to −50 ps/nm/km.

An eighteenth embodiment of the present disclosure may include the first embodiment, wherein the dispersion compensating fiber exhibits a chromatic dispersion slope at 1350 nm of −7 ps/nm$^2$/km to −0.2 ps/nm$^2$/km.

A nineteenth embodiment of the present disclosure may include the first embodiment, wherein the dispersion compensating fiber exhibits a dispersion at 1375 nm of −425 ps/nm/km to −70 ps/nm/km.

A twentieth embodiment of the present disclosure may include the first embodiment, wherein the dispersion compensating fiber exhibits a chromatic dispersion slope at 1375 nm of −11 ps/nm$^2$/km to −0.4 ps/nm$^2$/km.

A twenty-first embodiment of the present disclosure may include a dispersion compensating module, the dispersion compensating module including: a winding spool, a dispersion compensating fiber wound onto the winding spool, the dispersion compensating fiber including: a central core region having an outer radius r1 of 1.5 μm to 2 μm, and a maximum refractive index Δ1 of 1.15% to 1.6%, and a cladding region comprising (i) a first inner cladding (trench) region, surrounding the central core, having a refractive index Δ2 of −0.3% to −0.45% and an having an outer radius r2 of 5 μm to 7 μm, (ii) a second inner cladding (ring) region, surrounding the first inner cladding region, having a refractive index Δ3 of 0.35% to 0.5% and a radius r3 of 6 μm to 8 μm, and (iii) an outer cladding region, surrounding the second inner cladding region, wherein the DCF exhibits a cable cutoff of less than 1260 nm and a mode field diameter at 1310 nm of greater than 4 microns.

A twenty-second embodiment of the present disclosure may include an optical transmission system, the optical transmission system including: a transmitter; a receiver; an optical fiber transmission link optically coupling the receiver and the transmitter; wherein the optical fiber transmission link comprises a length of single mode fiber and a dispersion compensating module coupled to the length of single mode fiber, wherein the dispersion compensating module comprises: a winding spool, a dispersion compensating fiber wound onto the winding spool, the dispersion compensating fiber comprising: a central core region having an outer radius r1 of 1.5 μm to 2 μm, and a maximum refractive index Δ1 of 1.15% to 1.6%, and a cladding region comprising (i) a first inner cladding (trench) region, surrounding the central core, having a refractive index Δ2 of −0.3% to −0.45% and an having an outer radius r2 of 5 μm to 7 μm, (ii) a second inner cladding (ring) region, surrounding the first inner cladding region, having a refractive index Δ3 of 0.35% to 0.5% and a radius r3 of 6 μm to 8 μm and (iii) an outer cladding region, surrounding the second inner cladding region, wherein the DCF exhibits a cable cutoff of less than 1260 nm and a mode field diameter at 1310 nm of greater than 4 microns, and wherein the optical fiber transmission link comprising the dispersion compensating fiber coupled to the single-mode fiber and operating at wavelengths between 1265 nm and 1375 nm increases maximum link lengths of the optical fiber transmission link by more than 60% as compared to the link length of the optical fiber transmission link with the single-mode fiber only, and wherein the maximum link length is calculated from the maximum allowed positive and negative accumulated dispersion at wavelengths between 1265 nm and 1375 nm.

A twenty-third embodiment of the present disclosure may include an optical fiber, the optical fiber including: a central core region having an outer radius r1 of 1.5 μm to 2 μm, and a maximum refractive index Δ1 of 1.15% to 1.6%, and a cladding region comprising (i) a first inner cladding (trench) region, surrounding the central core, having a refractive index Δ2 of −0.3% to −0.45% and an having an outer radius r2 of 5 μm to 7 μm, (ii) a second inner cladding (ring) region, surrounding the first inner cladding region, having a refractive index Δ3 of 0.35% to 0.5% and a radius r3 of 6 μm to 8 μm, and (iii) an outer cladding region, surrounding the second inner cladding region, wherein the DCF exhibits a cable cutoff of less than 1260 nm and a mode field diameter at 1310 nm of greater than 4 microns.

A twenty-second embodiment of the present disclosure may include an optical fiber transmission link, the optical fiber transmission link including: a length of dispersion compensating fiber (DCF); and a single-mode fiber (SMF) having a zero dispersion wavelength of 1300 nm to 1324 nm and having a maximum length of 5.4 kms, wherein the DCF is optically coupled to the SMF, and wherein the minimum allowable accumulated dispersion of the optical fiber transmission link is −58.7 ps/nm and the maximum allowable accumulated dispersion of the optical fiber transmission link is 33.1 ps/nm.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
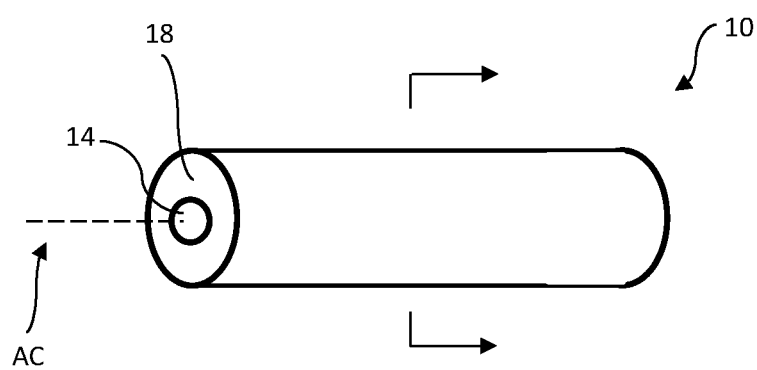
FIG. 1 is a side perspective view of an optical fiber according to one embodiment of the present disclosure.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure. The claims as set forth below are incorporated into and constitute part of this Detailed Description.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

In embodiments, the optical fiber disclosed herein includes a central core region. The core region may include a central axis and extend from the central axis to a radius $r_1$. The core region comprises a relative refractive index $\Delta_1$ relative to pure silica. A cladding region may encircle and directly contact the core region. The cladding region comprising a first inner cladding region, a second inner cladding region, and an outer cladding region. The first inner cladding region (also referred to as the trench region or the depressed index cladding region) may encircle and directly contact the central core. The first inner cladding region comprises a refractive index $\Delta_2$ relative to pure silica and extend from radius $r_1$ to radius $r_2$. The second inner cladding region (also referred to as the ring region) may encircle and directly contact the first inner cladding region. The second inner cladding region comprises a refractive index $\Delta_3$ comprises and extends from the radius $r_2$ to radius $r_3$. The outer cladding region may encircle and directly contact the second inner cladding region. The outer cladding region comprises a refractive index $\Delta_4$ comprises and extends from the radius $r_2$ to radius $r_4$. Various embodiments of optical fibers will be described herein in further detail with specific reference to the appended drawings.

In this specification and in the claims, which follow, reference will be made to a number of terms which shall be defined to have the following meanings:

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

"Radial position" and/or "radial distance," when used in reference to the radial coordinate "r" refers to radial position relative to the centerline (r=0) of the central core portion in the optical fiber.

The length dimension "micrometer" may be referred to herein as micron (or microns) or µm.

The "refractive index profile" is the relationship between refractive index or relative refractive index and radial distance r from the core portion's centerline. For relative refractive index profiles depicted herein as relatively sharp boundaries between various regions, normal variations in processing conditions may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the inner and/or common cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

Unless stated otherwise, the "relative refractive index percent" is defined as $\Delta\% = 100 \times (n_i^2 - n_c^2)/2n_i^2$, as used herein $n_c$ is the average refractive index of undoped silica glass. As used herein, the relative refractive index is represented by $\Delta$ and its values are given in units of "%", unless otherwise specified. The terms: relative refractive index percent, relative refractive index, refractive index delta, refractive index, relative refractive index delta, delta, $\Delta$, $\Delta\%$, %$\Delta$, delta %, % delta and percent delta may be used interchangeably herein. In cases where the refractive index of a region is less than the average refractive index of undoped silica, the relative index percent is negative and is referred to as having a depressed region or depressed index. In cases where the refractive index of a region is greater than the average refractive index of the cladding region, the relative index percent is positive. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. Examples of updopants include $GeO_2$ (germania), $Al_2O_3$, $P_2O_5$, $TiO_2$, Cl, and/or Br. Examples of downdopants include fluorine and $B_2O_3$. As described herein, while the relative refractive index of the optical profiles are calculated where index of $n_c$ is undoped silica, the entire index profile of the optical fiber can be shifted linearly up (or down) in order to obtain equivalent optical fiber properties.

The term "α-profile" (also referred to as an "alpha profile") refers to a relative refractive index profile $\Delta(r)$ that has the following functional form:

$$\Delta(r) = \Delta(r_0)\left\{1 - \left[\frac{|r - r_0|}{(r_1 - r_0)}\right]^\alpha\right\}$$

where $r_0$ is the point at which $\Delta(r)$ is maximum, $r_1$ is the point at which $\Delta(r)$ is zero, and r is in the range $r_i \leq r \leq r_f$, where $r_i$ is the initial point of the α-profile, $r_f$ is the final point of the α-profile, and α is a real number. In some embodiments, examples shown herein can have a core alpha of $1 \leq \alpha \leq 100$. In practice, an actual optical fiber, even when the target profile is an alpha profile, some level of deviation from the ideal configuration can occur. Therefore, the alpha parameter for an optical fiber may be obtained from a best fit of the measured index profile, as is known in the art.

The term "graded-index profile" refers to an α-profile, where α<10. The term "step-index profile" refers to an α-profile, where α≥10.

The "effective area" can be defined as:

$$A_{eff} = \frac{2\pi \left[ \int_0^\infty (f(r))^2 r dr \right]^2}{\int_0^\infty (f(r))^4 r dr}$$

where f(r) is the transverse component of the electric field of the guided optical signal and r is radial position in the fiber. "Effective area" or "$A_{eff}$" depends on the wavelength of the optical signal. Specific indication of the wavelength will be made when referring to "Effective area" or "$A_{eff}$" herein. Effective area is expressed herein in units of "µm$^2$", "square micrometers", "square microns" or the like.

Unless otherwise noted herein, optical properties (such as dispersion, dispersion slope, etc.) are reported for the LP01 mode.

"Chromatic dispersion," herein referred to as "dispersion" unless otherwise noted, of an optical fiber is the sum of the material dispersion, the waveguide dispersion, and the inter-modal dispersion. "Material dispersion" refers to the manner in which the refractive index of the material used for the optical core affects the velocity at which different optical wavelengths propagate within the core. "Waveguide dispersion" refers to dispersion caused by the different refractive indices of the core and cladding of the optical fiber. In the case of single mode waveguide fibers, the inter-modal dispersion is zero. Dispersion values in a two-mode regime assume zero intermodal dispersion is zero. The zero dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1310 nm or 1550 nm, as noted, and are expressed in units of ps/nm/km and ps/nm$^2$/km, respectively. Chromatic dispersion is measured as specified by the IEC 60793-1-42:2013 standard, "Optical fibres—Part 1-42: Measurement methods and test procedures—Chromatic dispersion."

The cutoff wavelength of an optical fiber is the minimum wavelength at which the optical fiber will support only one propagating mode. For wavelengths below the cutoff wavelength, multimode transmission may occur and an additional source of dispersion may arise to limit the fiber's information carrying capacity. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

The bend resistance of an optical fiber, expressed as "bend loss" herein, can be gauged by induced attenuation under prescribed test conditions as specified by the IEC-60793-1-47:2017 standard, "Optical fibres—Part 1-47: Measurement methods and test procedures—Macrobending loss." For example, the test condition can entail deploying or wrapping the fiber one or more turns around a mandrel of a prescribed diameter, e.g., by wrapping 1 turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

The term "attenuation," as used herein, is the loss of optical power as the signal travels along the optical fiber. Attenuation is measured as specified by the IEC 60793-1-40:2019 standard entitled "Optical fibers—Part 1-40: Attenuation measurement methods."

The term "trench" as used herein, refers to a cladding region that has a variable refractive index with a minimum refractive index that is lower than that of the adjacent cladding regions that are in contact therewith. The trench region is down-doped with a suitable dopant such as fluorine.

The term "ring" as used herein, refers to a cladding region that has a variable refractive index with a maximum refractive index that is higher than that of the adjacent cladding regions that are in contact therewith. The ring region has a variable refractive index with a maximum refractive index that is greater than the variable refractive index of the adjacent trench region. The ring region is up-doped with a suitable dopant such as germania.

The mode field diameter (MFD) is measured using the Petermann II method and was determined from:

$$MFD = 2w$$

$$w = \frac{\int_0^\infty (f(r))^2}{\int_0^\infty \left( \frac{df(r)}{dr} \right)^2 r dr}$$

where f(r) is the transverse component of the electric field distribution of the guided light and r is the radial position in the fiber. Unless otherwise specified, "mode field diameter" or "MFD" refers to the mode field diameter at 1310 nm.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the term "substantially free," when used to describe the concentration and/or absence of a particular up-dopant or down-dopant in a particular portion of the fiber, means that the constituent component is not intentionally added to the fiber. However, the fiber may contain traces of the constituent component as a contaminant or trace in amounts of less than 0.15 wt. %.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a side view of an exemplary dispersion compensating fiber (DCF) 10 is provided. The DCF 10 has a centerline AC and a radial coordinate r. In some embodiments, the DCF 10 has a germania doped silica central core 14 of radius $r_1$ surrounded by a cladding 18 having a maximum radius $r_{max}$. The DCF 10 may have an outer radius for cladding 18 of $r_{max}$=62.5 microns.

The core 14 has a core alpha profile ($Core_\alpha$) where $1 \leq Core_\alpha \leq 100$ and a maximum relative refractive index delta $\Delta_1$, where in some embodiments $\Delta_1$ is 1.15% to 1.6%. In some embodiments, the core 14 has a radius $r_1$, where in embodiments $r_1$ is 1.5 μm to 2 μm.

In some embodiments, the core 14 can be made from silica doped with germania (Ge) at a Ge concentration of ≥4.5 wt %, ≥5.0 wt %, ≥5.5 wt %, ≥6.0 wt %, ≥6.5 wt %, or ≥7.0 wt %. The single mode optical fiber 10 can include the germania doped silica central core 14 region where the core alpha profile ($Core_\alpha$) is $1 \leq Core_\alpha \leq 100$, preferably $1 \leq Core_\alpha \leq 20$.

Figure 2:
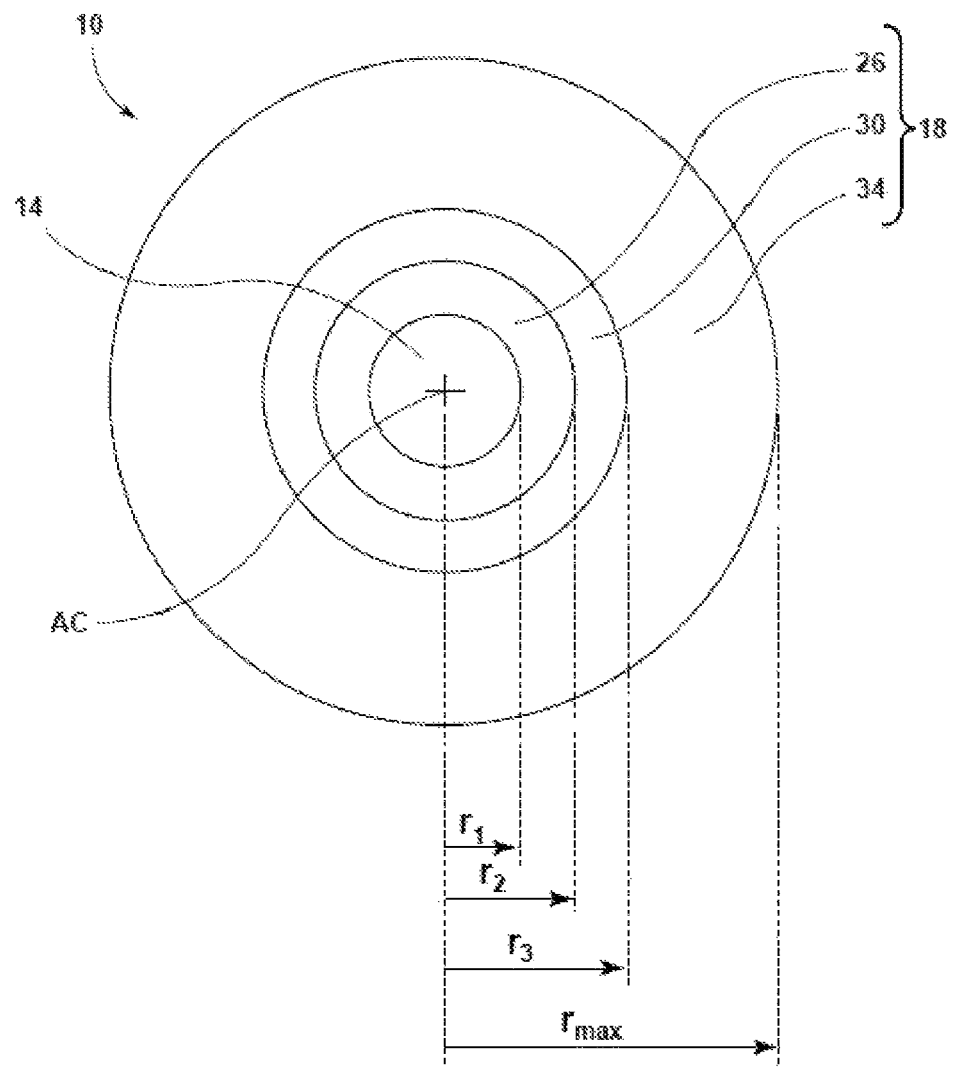
FIG. 2 schematically depicts a cross-section of the multicore optical fiber depicted in FIG. 1, according to one or more embodiments described herein.
Figure 3:
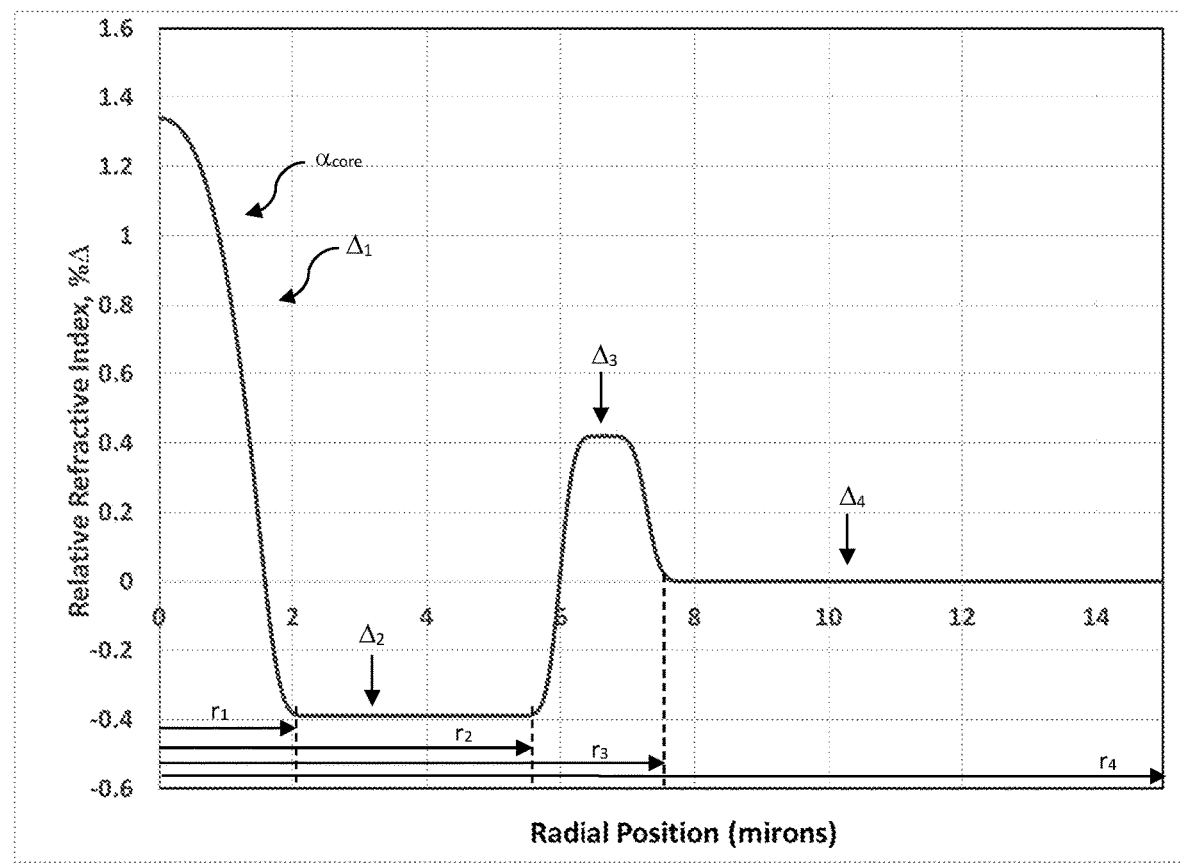
FIG. 3 graphically depicts a relative refractive index profile of an exemplary optical fiber, according to one or more embodiments described herein.

FIG. 2 depicts a schematic cross-sectional diagram of the DCF 10 according to some embodiments of the current disclosure. In FIG. 3, a plot of the relative refractive index profile ("index profile") Δ versus radius r for the optical fiber represented in FIG. 2 is shown. The cladding 18 of optical fiber 10 includes three regions that progress outwardly from the core 14 in the following order: the trench region 26 having the radius $r_2$ and the refractive index $\Delta_2$; the ring region 30 surrounding the first cladding layer 26 extending to the radial distance $r_3$ and having the refractive index $\Delta_3$ and the outer cladding region 34 having a radius $r_{max}$ and having the refractive index $\Delta_4$. In some embodiments, adjacent cladding regions are coupled with one another while the inner cladding region 26 is in contact with and coupled with the core 14. In some embodiments, the inner cladding region 26 may be offset from the core region 14 by a cladding region (not shown) sandwiched between core region 14 and the inner cladding region 26.

In some embodiments, the $\Delta_1$ ranges from 1.15% to 1.6%. In some embodiments, the 42 of the trench region ranges from −0.3% to −0.45%. In some embodiments, $r_2$ of the first inner cladding region is 5 μm to 7 μm. The $\Delta_3$ of the ring region is greater than the $\Delta_2$ of the trench region. In some embodiments, the $\Delta_3$ of the ring region ranges from 0.35 to 0.5%. In some embodiments, $r_3$ of the second inner cladding region ranges from 6 μm to 8 μm. The $\Delta_4$ of the outer cladding region is greater than the $\Delta_2$ of the trench region and less than the $\Delta_3$ of the ring region. In some embodiments, the $\Delta_4$ of the outer cladding region is 0.05 to 0.1%. In some embodiments, $r_4$ (also referred to herein as $r_{max}$) of the outer cladding region is 62.5 μm.

In some embodiments, the DCF 10 exhibits a chromatic dispersion at 1265 nm of −150 ps/nm/km to −50 ps/nm/km. In some embodiments, the DCF 10 may exhibit a chromatic dispersion slope at 1265 nm of −2.6 ps/nm²/km to −0.03 ps/nm²/km. In some embodiments, the DCF 10 exhibits a chromatic dispersion at 1290 nm of −250 ps/nm/km to −50 ps/nm/km. In some embodiments, the DCF 10 may exhibit a chromatic dispersion slope at 1290 nm of −5.5 ps/nm²/km to −0.05 ps/nm²/km. In some embodiments, the DCF 10 exhibits a chromatic dispersion at 1310 nm of 375 ps/nm/km to −50 ps/nm/km. In some embodiments, the DCF 10 may exhibit a chromatic dispersion slope at 1310 nm of −6.5 ps/nm²/km to −0.01 ps/nm²/km. In some embodiments, the DCF 10 exhibits a chromatic dispersion at 1330 nm of −460 ps/nm/km to −50 ps/nm/km. In some embodiments, the DCF 10 may exhibit a chromatic dispersion slope at 1330 nm of −9 ps/nm²/km to −0.08 ps/nm²/km. In some embodiments, the DCF 10 exhibits a chromatic dispersion at 1350 nm of −550 ps/nm/km to −50 ps/nm/km. In some embodiments, the DCF 10 may exhibit a chromatic dispersion slope at 1350 nm of −7 ps/nm²/km to −0.2 ps/nm²/km. In some embodiments, the DCF 10 exhibits a chromatic dispersion at 1375 nm of −425 ps/nm/km to −70 ps/nm/km. In some embodiments, the DCF 10 may exhibit a chromatic dispersion slope at 1375 nm of −11 ps/nm²/km to −0.4 ps/nm²/km. In some embodiments, the DCF 10 may exhibit a mode field diameter (MFD) at 1310 nm of greater than 4 microns. In some embodiments, the optical fiber 10 may exhibit a 22 mm cable cut-off less than or equal to 1260 nm.

Table 1 and Table 2 below sets forth exemplary embodiments of the DCF 10 described above.

TABLE 1

|  | Ex 1 | Ex 2 | Ex 3 | Ex 4 | Ex 5 |
| --- | --- | --- | --- | --- | --- |
| Core Maximum Refractive Index, $\Delta_{1max}$ | 1.35 | 1.4 | 1.45 | 1.5 | 1.5 |
| Core Radius, $R_1$, microns | 1.75 | 1.75 | 1.75 | 1.75 | 1.8 |
| Core Alpha | 2.5 | 2.5 | 2.5 | 2.5 | 2.5 |
| Trench Refractive Index, $\Delta_2$ | −0.39 | −0.39 | −0.39 | −0.39 | −0.39 |
| Trench Radius, $R_2$. microns | 6 | 6 | 6 | 6 | 6 |
| Ring Refractive Index, $\Delta_3$ | 0.42 | 0.42 | 0.42 | 0.42 | 0.42 |
| Ring Radius, $R_3$. microns | 7.3 | 7.3 | 7.3 | 7.3 | 7.3 |
| Dispersion at 1265 nm (ps/nm/km) | −93.811 | −74.14 | −65.003 | −59.98 | −53.74 |
| Dispersion Slope at 1265 nm (ps/nm²/km) | −0.87 | −0.367 | 0.17568 | −0.087 | −0.0323 |
| Dispersion at 1290 nm (ps/nm/km) | −124.82 | −86.66 | −70.935 | −62.99 | −55.02 |
| Dispersion Slope at 1290 nm (ps/nm²/km) | −1.754 | −0.677 | −0.314 | −0.161 | −0.0747 |
| Dispersion at 1310 nm (ps/nm/km) | −171.49 | −104.04 | −78.804 | −67.016 | −56.961 |
| Dispersion Slope at 1310 nm (ps/nm²/km) | −3.089 | −1.1203 | −0.493 | −0.249 | −0.1204 |
| Dispersion at 1330 nm (ps/nm/km) | −251.73 | −133.05 | −91.156 | −73.161 | −59.94 |

TABLE 1-continued

|  | Ex 1 | Ex 2 | Ex 3 | Ex 4 | Ex 5 |
|---|---|---|---|---|---|
| Dispersion Slope at 1330 nm (ps/nm$^2$/km) | −4.977 | −1.8827 | −0.777 | −0.378 | −0.182 |
| Dispersion at 1350 nm (ps/nm/km) | −364.21 | −181.83 | −110.76 | −82.47 | −64.36 |
| Dispersion Slope at 1350 nm (ps/nm$^2$/km) | −5.2977 | −3.127 | −1.242 | −0.574 | −0.267 |
| Dispersion at 1375 nm (ps/nm/km) | −425.55 | −284.17 | −152.8 | −101.25 | −72.82 |
| Dispersion Slope at 1375 nm (ps/nm$^2$/km) | 2.0903 | −4.8723 | −2.248 | −0.978 | −0.426 |
| LP11 Cutoff (nm) | 1181.6 | 1181.6 | 1181.6 | 1181.6 | 1181.8 |
| LP02 Cutoff (nm) | 1337.1 | 1364.6 | 1390.1 | 1413.6 | 1437.7 |
| Cable Cutoff | 1193 | 1220 | 1246 | 1259 | 1279 |
| MFD at 1310 nm (microns) | 4.29 | 4.28 | 4.15 | 4.056 | 4.025 |
| Aeff at 1310 nm (micron$^2$) | 16.281 | 13.98 | 12.93 | 12.26 | 12.044 |

TABLE 2

|  | Ex 6 | Ex 7 | Ex 8 |
|---|---|---|---|
| Core Maximum Refractive Index, $\Delta_{1max}$ | 1.3 | 1.35 | 1.35 |
| Core Radius, $R_1$, microns | 1.75 | 1.75 | 1.75 |
| Core Alpha | 2.5 | 2.5 | 2.5 |
| Trench Refractive Index, $\Delta_2$ | −0.39 | −0.35 | −0.42 |
| Trench Radius, $R_2$, microns | 6 | 6 | 6 |
| Ring Refractive Index, $\Delta_3$ | 0.42 | 0.42 | 0.42 |
| Ring Radius, $R_3$, microns | 7.3 | 7.3 | 7.3 |
| Dispersion at 1265 nm (ps/nm/km) | −148.27 | −84.231 | −105.97 |
| Dispersion Slope at 1265 nm (ps/nm$^2$/km) | −2.593 | −0.529 | −1.378 |
| Dispersion at 1290 nm (ps/nm/km) | −243.9 | −101.77 | −159.16 |
| Dispersion Slope at 1290 nm (ps/nm$^2$/km) | −5.3109 | −0.921 | −3.2636 |
| Dispersion at 1310 nm (ps/nm/km) | −370.14 | −124.7 | −252.15 |
| Dispersion Slope at 1310 nm (ps/nm$^2$/km) | −6.263 | −1.422 | −6.476 |
| Dispersion at 1330 nm (ps/nm/km) | −454.11 | −159.7 | −419.62 |
| Dispersion Slope at 1330 nm (ps/nm$^2$/km) | −0.0851 | −2.121 | −9.067 |
| Dispersion at 1350 nm (ps/nm/km) | −364.97 | −209.77 | −550.35 |
| Dispersion Slope at 1350 nm (ps/nm$^2$/km) | 7.315 | −2.827 | −0.221 |
| Dispersion at 1375 nm (ps/nm/km) | −178.41 | −282.75 | −353.95 |
| Dispersion Slope at 1375 nm (ps/nm$^2$/km) | 5.842 | −2.47 | 11.02 |
| LP11 Cutoff (nm) | 1181.6 | 1209.5 | 1162.7 |
| LP02 Cutoff (nm) | 1307.7 | 1358.3 | 1321.7 |
| Cable Cutoff | 1163 | 1213 | 1180 |
| MFD at 1310 nm (microns) | 5.124 | 4.498 | 4.57 |
| Aeff at 1310 nm (micron$^2$) | 25.64 | 15.78 | 17.473 |

Figure 4:
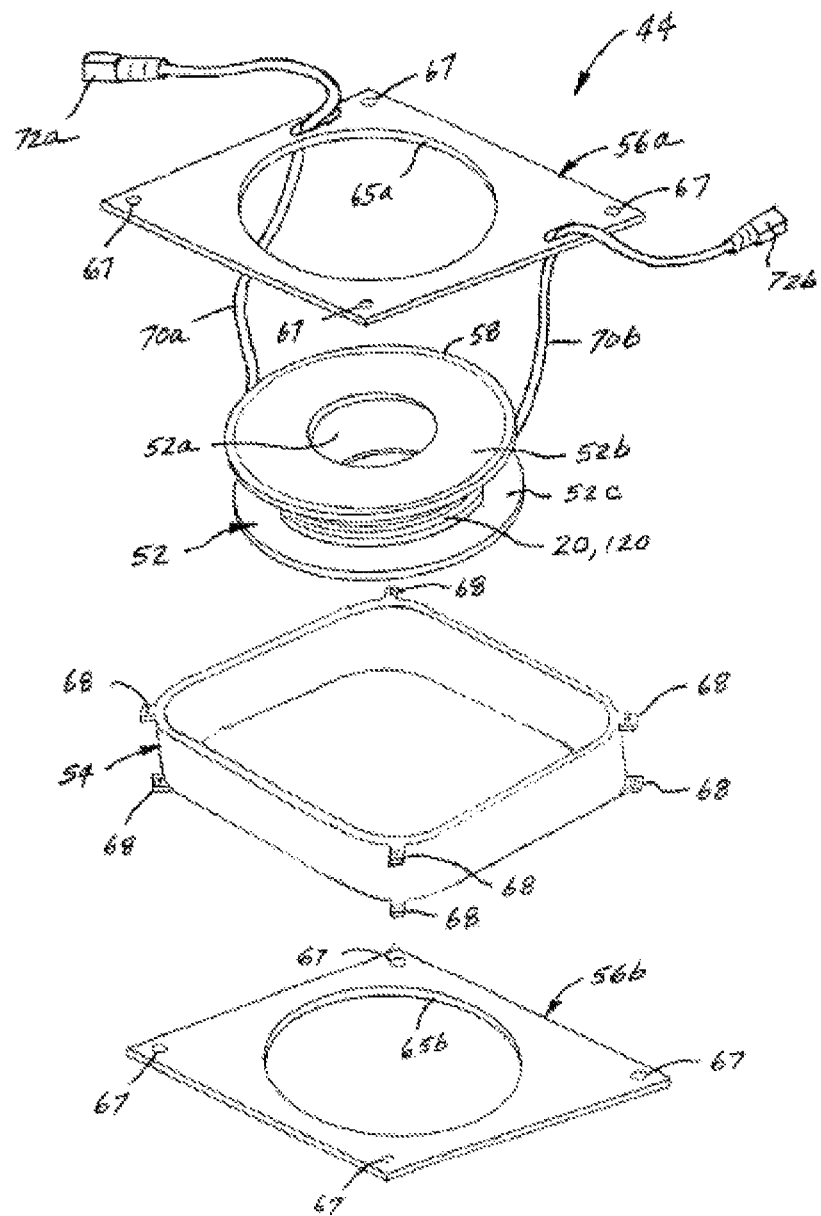
FIG. 4 depicts an exploded view of a dispersion compensating module including an embodiment of optical fiber, according to one or more embodiments described herein.

In some embodiments, the DCF disclosed herein is deployed in a dispersion compensating modules wherein the fiber is wound around a hub (e.g. a winding spool). FIG. 4 illustrates an exemplary construction of a DC module 44 in accordance with an embodiment of the invention. DC module 44 includes a spool 52 having a cylindrical center 52a preferably of less than 254 mm in diameter and end flanges 52b, 52c. The DC fiber 20 is wound about the center 52a and abuts the inside surfaces of flanges 52b, 52c. The spool 52 is packaged and held in a housing assembly including a center 54 and top and bottom plates 56a, 56b. The spool 52 includes slight annular recesses formed in the outer facing peripheries of the flanges 52b, 52c. These recesses fit in holes 65a, 65b in the plates 56a, 56b such that the spool is centered and located therewith. The plates 56a, 56b are secured to the center 54 by fasteners (not shown) which are inserted through bores 67 and into tabs 68. Pigtail cables 70a, 70b of preferably SM fiber are secured to either end of the DC fiber 20 and connectors 72a, 72b facilitate attachment to other system components.

It should be noted that the fibers disclosed in here do not necessarily have to be employed only in dispersion compensating modules, and instead the fibers could be employed in dispersion compensating fiber cables (rather than enclosed modules as described above).

Figure 5:
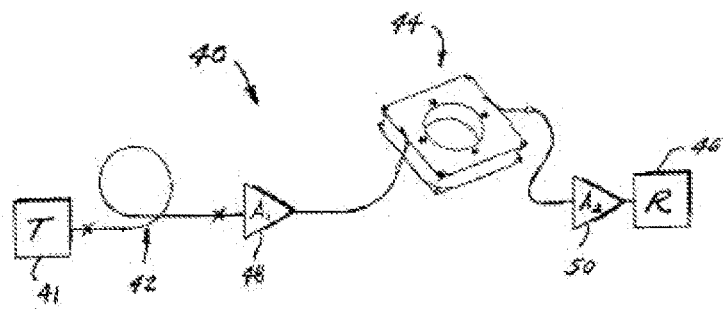
FIG. 5 illustrates an optical transmission system according to one or more embodiments described herein.

FIG. 5 illustrates an optical transmission system including the DC fiber in accordance with embodiment described above. The system 40 has transmitter (T) 41 capable of launching an optical signal(s) into a length of transmission fiber 42, such as a SM G.652 fiber, optically coupled to it by a splice (shown as the x) or other suitable coupling apparatus. A DC module 44 is also included in the system 40. The module 44 has housed within it, a dispersion compensating fiber as described above. The DC fiber is optically coupled to the transmission fiber 42 and to a receiver (R) 46. Although, the system 40 is described in terms of a transmitter 41 and a receiver 46 with unidirectional signals, it should be recognized that the system 40 may have signals traveling in both direction, as well. The system 40 may also include amplifiers, such as pre-amp 48 and power amp 50. Other conventional system components may also be included.

Figure 6:
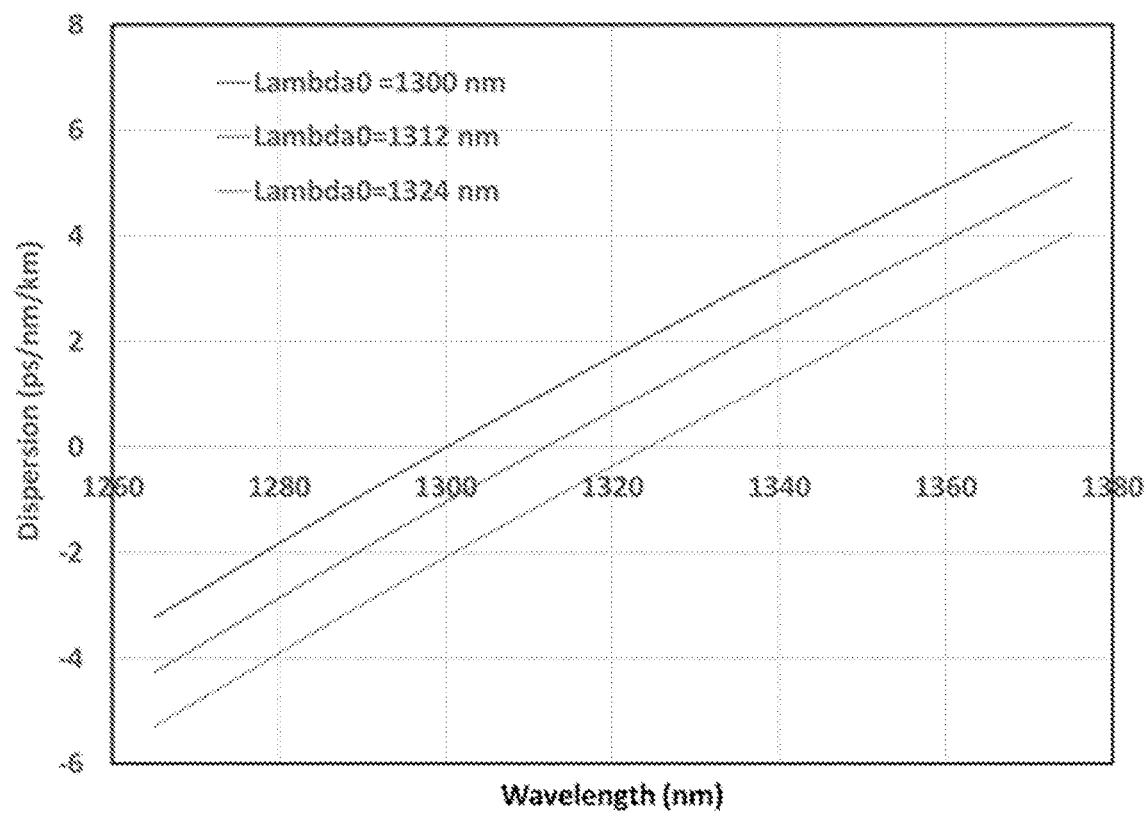
FIG. 6 depicts dispersion characteristics of a standard SM G.652 fiber having a zero dispersion wavelength between 1300 and 1324 nm according to one or more embodiments described herein.
Figure 7:
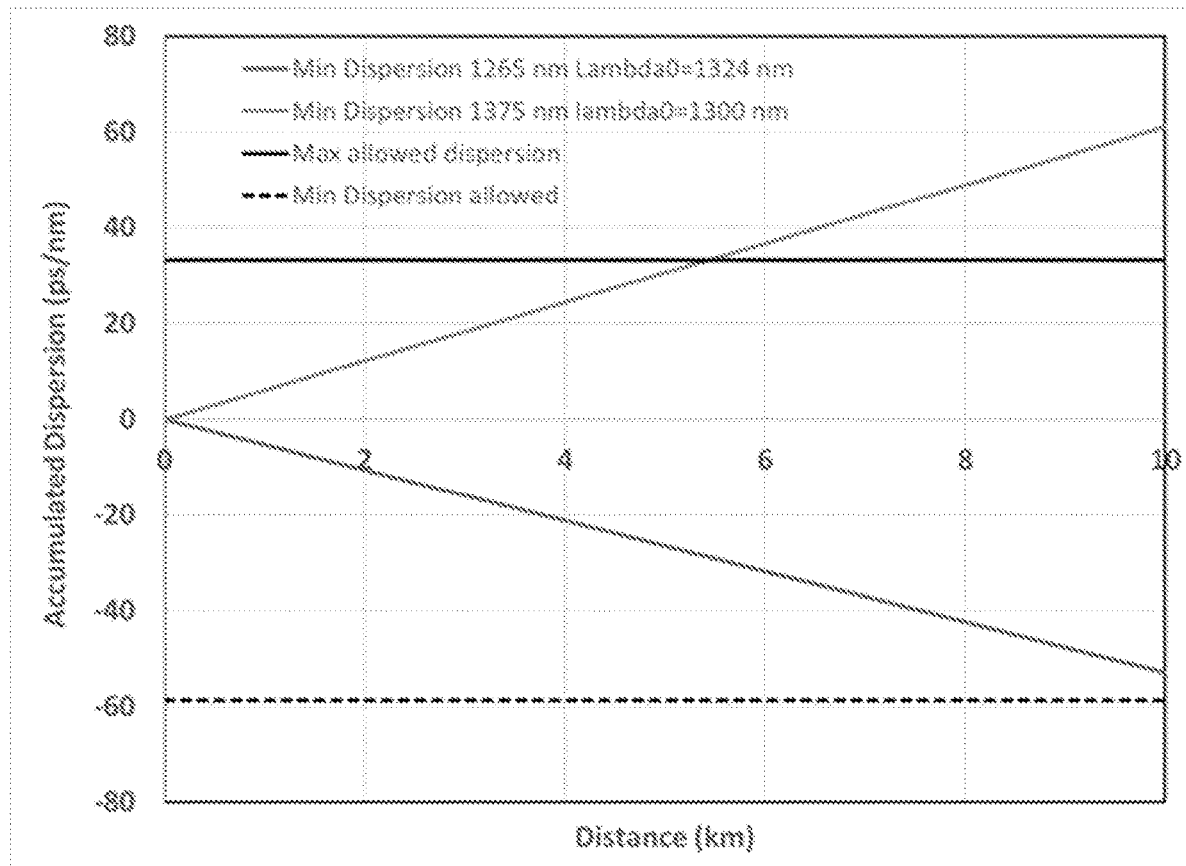
FIG. 7 depicts accumulated dispersion as a function of distance for a SM G.652 fiber having a zero dispersion wavelength between 1300 and 1324 nm according to one or more embodiments described herein.
Figure 8A:
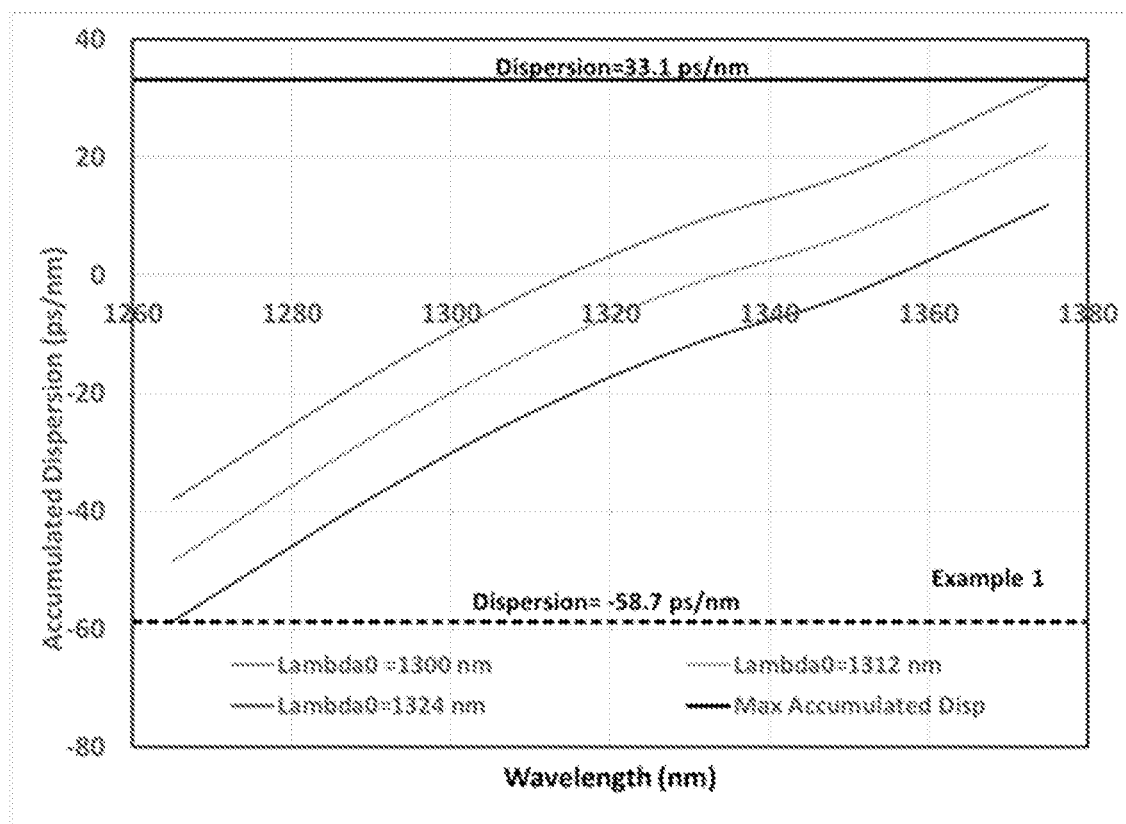
FIGS. 8A-8H depict the accumulated dispersion characteristics for each of the inventive examples listed in Table 3.
Figure 8B:
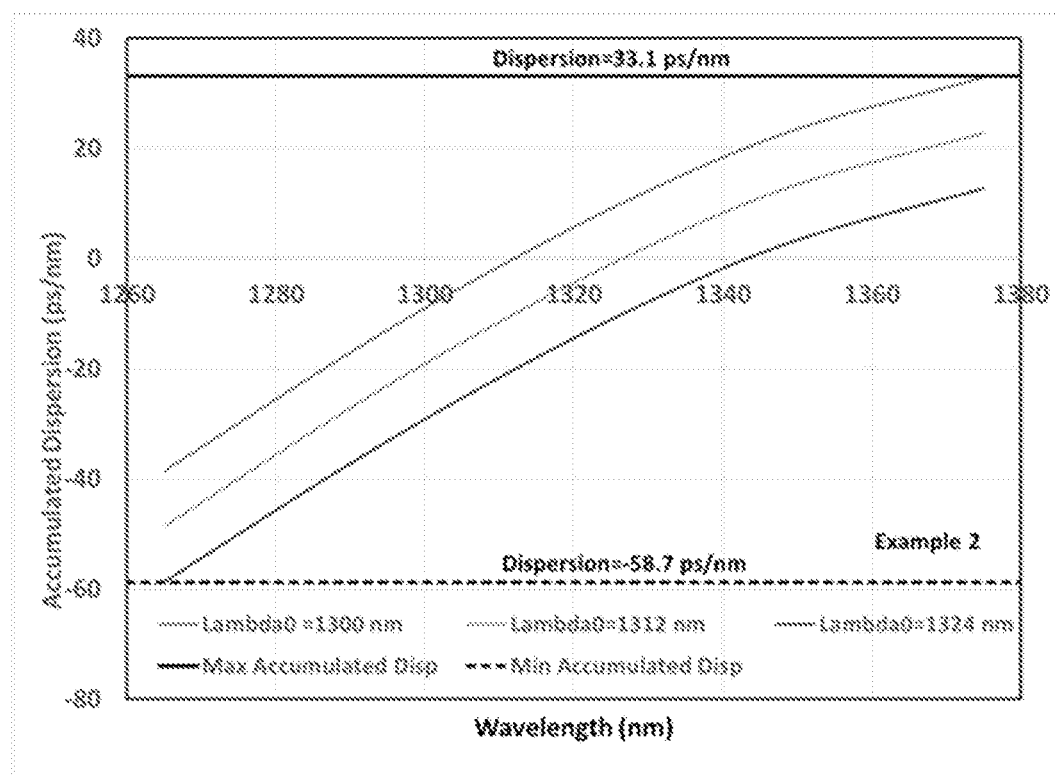
Figure 8C:
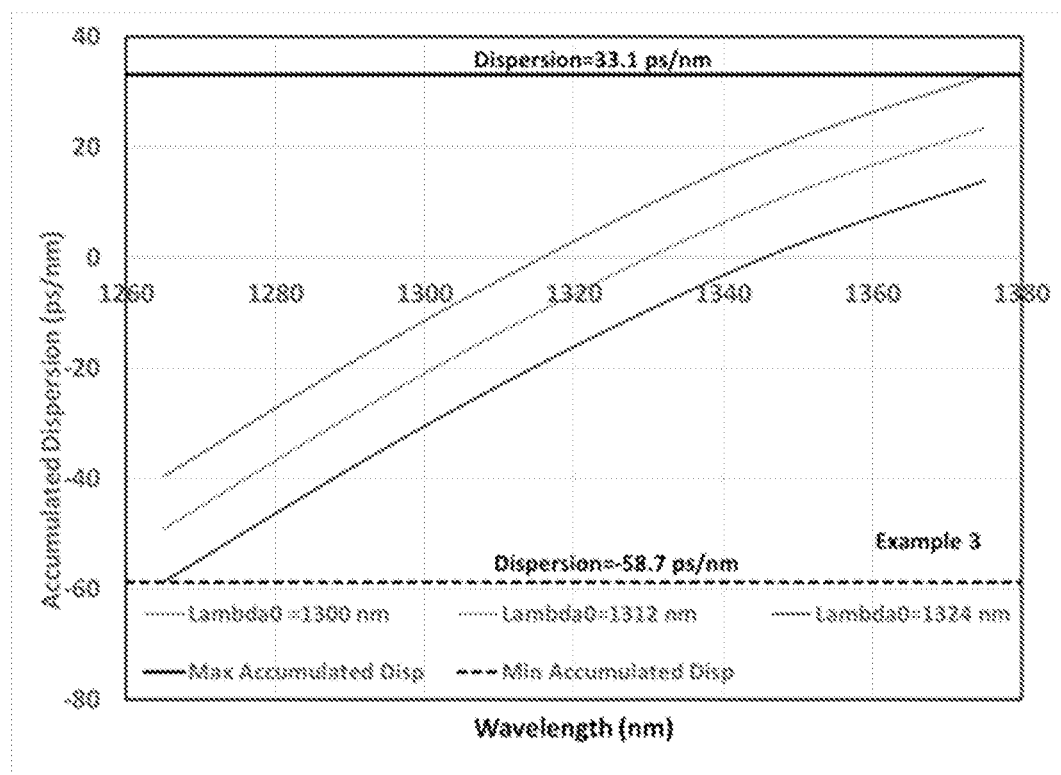
Figure 8D:
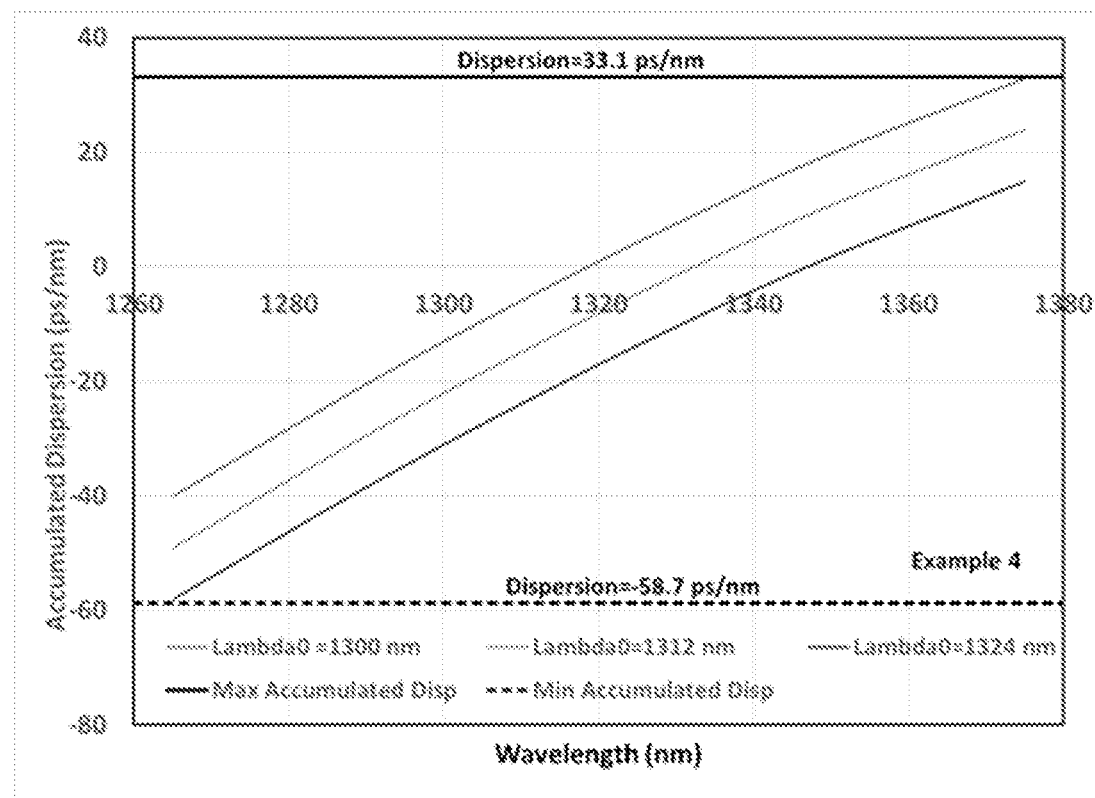
Figure 8E:
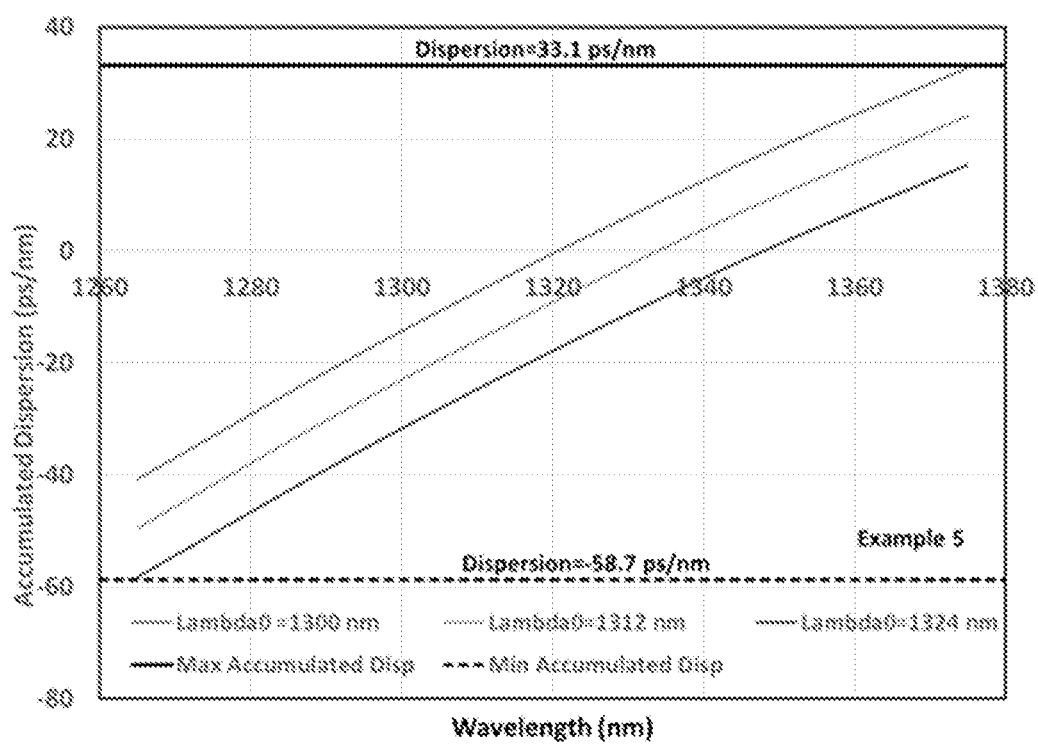
Figure 8F:
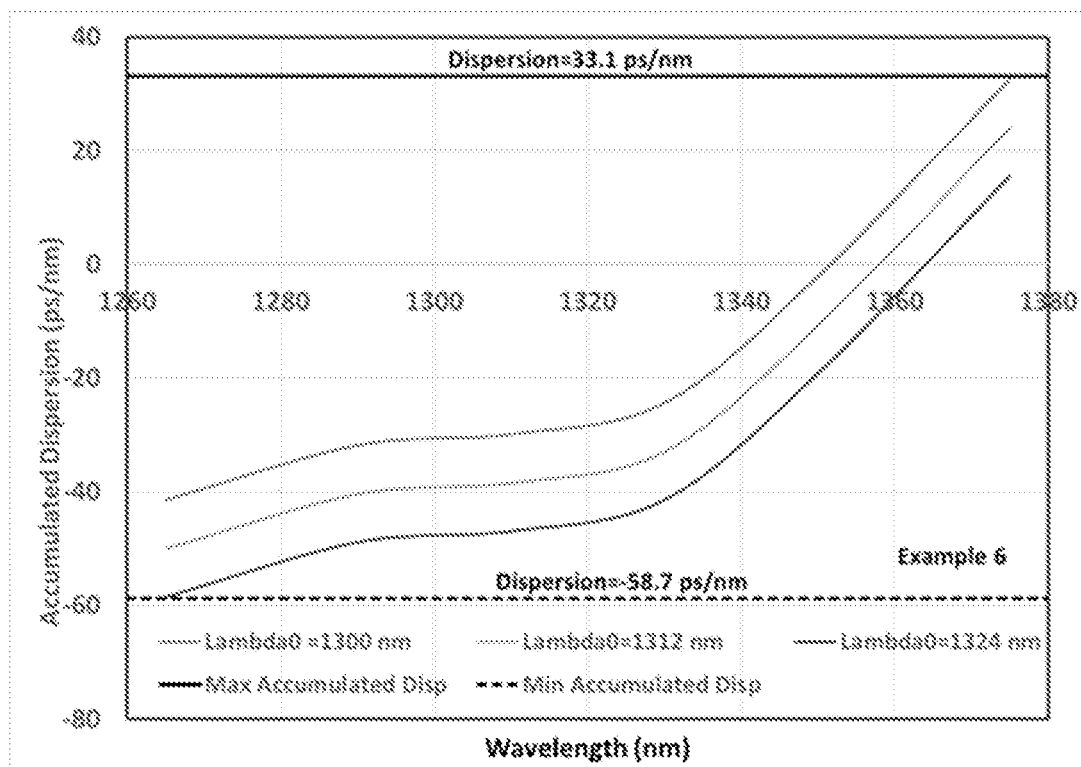
Figure 8G:
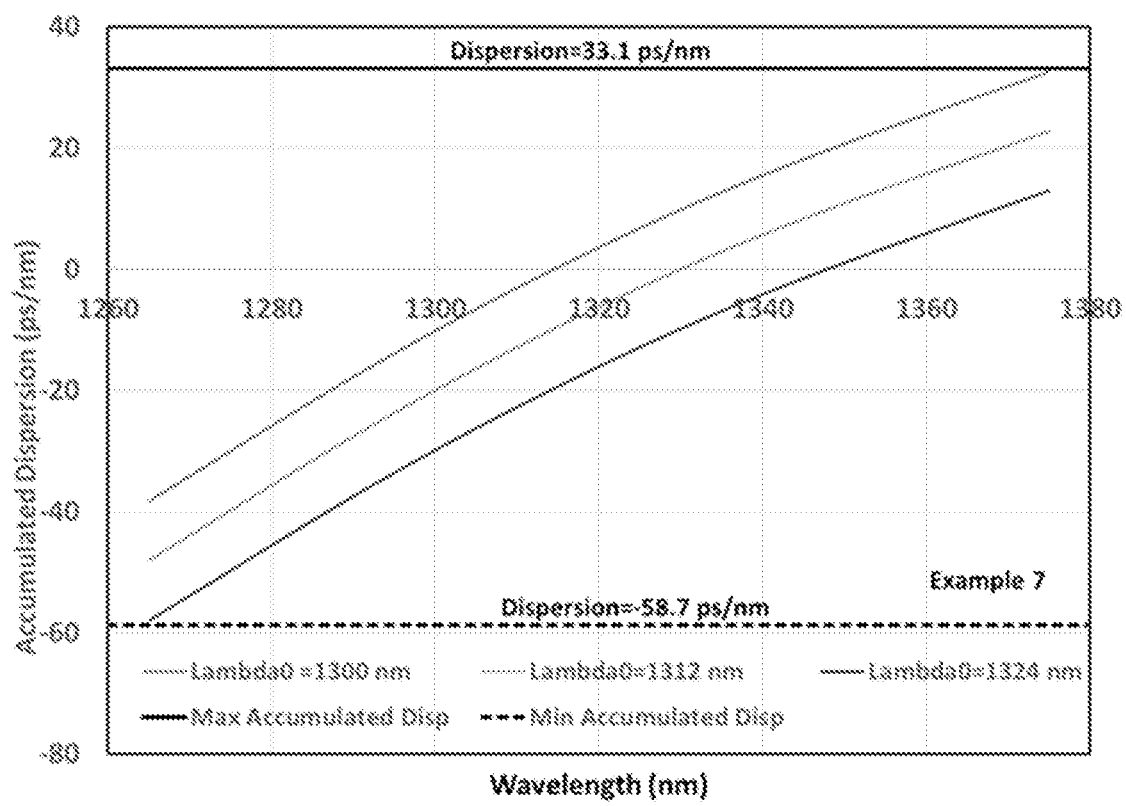
Figure 8H:
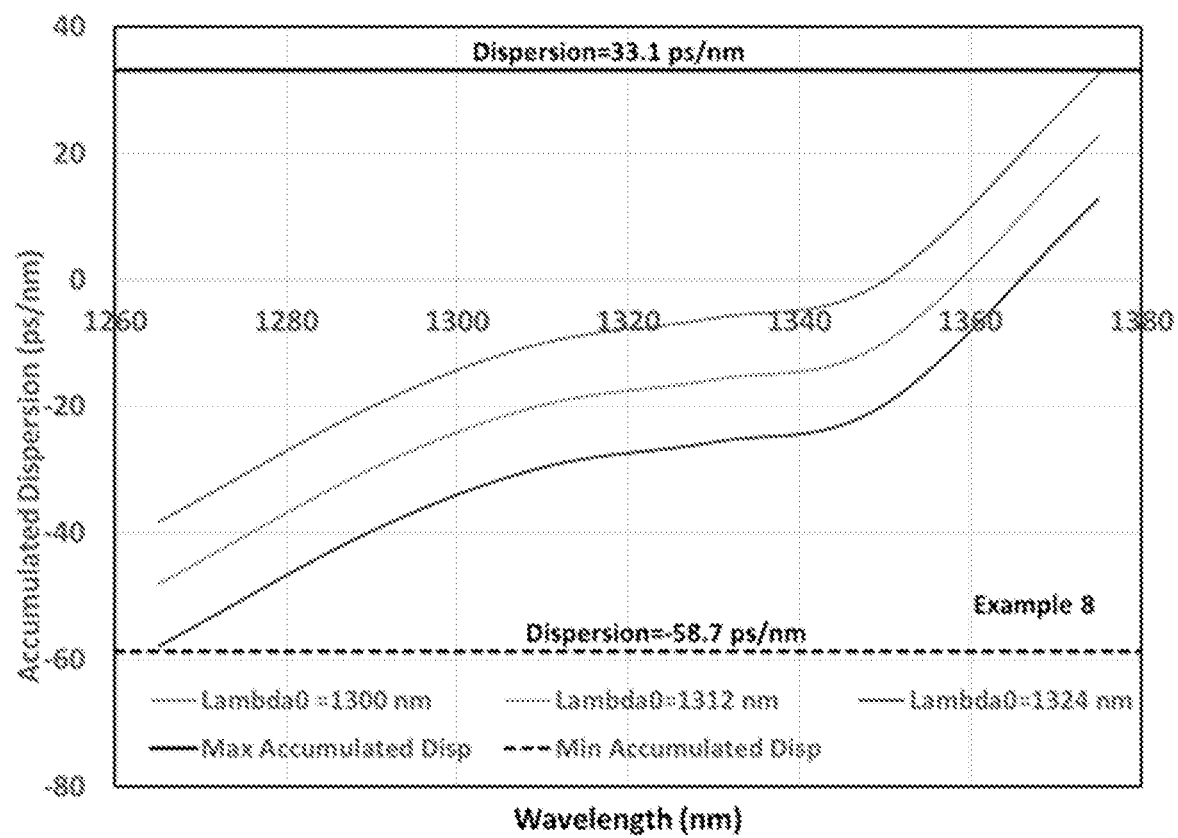

FIG. 6 depicts dispersion characteristics of a standard SM G.652 fiber having a zero dispersion wavelength between 1300 and 1324 nm. To use a SM G.652 fiber in a 5G front haul O-band transmission systems, the accumulated dispersions would need to meet the dispersion system requirements over the complete range of channel wavelengths and define the reach of the transceiver. For example, for a 5G front haul WDM systems with 12 channels, the minimum and maximum allowable accumulated dispersions have been calculated to be −58.7 ps/nm and 33.1 ps/nm respectively. The higher magnitude of the minimum accumulated dispersion is due to the position chirp of the modulated laser. The zero dispersion wavelength for standard single mode G.652 fiber is from 1300 nm to 1324 nm. As a result, the dispersion characteristic for the fiber with zero dispersion wavelength of 1300 nm defines the link length corresponding to maximum accumulated dispersion and the dispersion characteristic for the fiber with zero dispersion wavelength of 1324 nm defines the link length corresponding to minimum accumulated dispersion. If a standard single mode G.652 fiber is used in such a system, FIG. 7 shows that the accumulated dispersion reaches the maximum allowance dispersion limit for a link length of about 5.4 kms, thereby limiting the use of such a fiber in such systems. To extend the reach of standard SMF G.652 fiber in 5G front haul O-band systems, an optical fiber transmission link comprising the dispersion compensating fibers used in combination with the SMF fiber can extend the reach of the optical fiber transmission link by greater than 60% as compared to only using the SMF. In some embodiments, the optical fiber transmission link comprising the dispersion compensating fibers used in combination with the SMF fiber can extend the reach of the optical fiber transmission link by greater than 70% as compared to only using the SMF. In other embodiments, an optical fiber transmission link comprising the dispersion compensating fibers used in combination with the SMF fiber can extend the reach of the optical fiber transmission link by greater than 80% as compared to only using the SMF.

Table 3 shows the increase in optical fiber transmission link length that is achieved for each of the inventive examples in Table 1 and Table 2. Table 3 also shows the length of standard SMF G.652 fiber lengths, along with the length of the dispersion compensating fiber for each inventive examples. In some embodiments, the optical fiber transmission link length is greater than 8.4 kms. In some embodiments, the optical fiber transmission link length is greater than 9 kms. In some embodiments, the optical fiber transmission link length is greater than 9.5 kms. In still some embodiments, the optical fiber transmission link length is greater than 9.9 kms. FIGS. 8A-8H depict the accumulated dispersion characteristics for each of the inventive examples listed in Table 3.

TABLE 3

| Design | Max Length of Transmitted Fiber (km) | Length of Compensated Fiber (km) | Total Maximum Accumulated Dispersion (ps/km) | Total Minimum Accumulated Dispersion (ps/km) | Total Length (km) | % Increase in Transmission Length over Uncompensated Fiber |
|---|---|---|---|---|---|---|
| Uncompensated SMF fiber | 5.4 | 0 | 33 | −28.6 | 5.40 | 0.00 |
| Ex 1 | 9.9 | 0.066 | 32.4 | −58.62 | 9.97 | 84.56 |
| Ex 2 | 9.75 | 0.094 | 32.86 | −58.6 | 9.84 | 82.30 |
| Ex 3 | 9.2 | 0.152 | 32.98 | −58.6 | 9.35 | 73.19 |
| Ex 4 | 8.7 | 0.2 | 32.9 | −58.07 | 8.90 | 64.81 |
| Ex 5 | 8.4 | 0.255 | 32.76 | −58.19 | 8.66 | 60.28 |
| Ex 6 | 8.25 | 0.1 | 32.76 | −58.52 | 8.35 | 54.63 |
| Ex 7 | 9.5 | 0.09 | 32.6 | −57.89 | 9.59 | 77.59 |
| Ex 8 | 9.5 | 0.072 | 32.56 | −57.94 | 9.57 | 77.26 |

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical fiber transmission link, comprising:
   a length of dispersion compensating fiber (DCF) comprising:
   a central core region having an outer radius r1 of 1.5 μm to 2 μm, and a maximum refractive index Δ1 of greater than or equal to 1.15% and less than 1.6%, and
   a cladding region comprising (i) a first inner cladding (trench) region, surrounding the central core, having a refractive index Δ2 of −0.3% to −0.45% and an outer radius r2 of 5 μm to 7 μm, (ii) a second inner cladding (ring) region, surrounding the first inner cladding region, having a refractive index Δ3 of 0.35% to 0.5% and a radius r3 of 6 μm to 8 μm, and (iii) an outer cladding region, surrounding the second inner cladding region,
   wherein the DCF exhibits a cable cutoff of less than 1260 nm and a mode field diameter at 1310 nm of greater than 4 microns;
   the dispersion compensating fiber coupled to a length of single-mode fiber (SMF) having a zero dispersion wavelength of 1300 nm to 1324 nm;
   wherein the optical fiber transmission link comprising the dispersion compensating fiber coupled to the single-mode fiber and operating at wavelengths between 1265 nm and 1375 nm increases maximum link lengths of the optical fiber transmission link by more than 60% as compared to the link length of the optical fiber transmission link with the single-mode fiber only; and
   wherein the maximum link length is calculated from the maximum allowed positive and negative accumulated dispersion at wavelengths between 1265 nm and 1375 nm.

2. The optical fiber transmission link of claim 1, wherein the optical fiber transmission link comprising the dispersion compensating fiber coupled to the single-mode fiber and operating at wavelengths between 1265 nm and 1375 nm increases link lengths of the optical fiber transmission link by more than 70% as compared to the link length of the optical fiber transmission link with the single-mode fiber only.

3. The optical fiber transmission link of claim 1, wherein the optical fiber transmission link comprising the dispersion compensating fiber coupled to the single-mode fiber and operating at wavelengths between 1265 nm and 1375 nm increases link lengths of the optical fiber transmission link by more than 80% as compared to the link length of the optical fiber transmission link with the single-mode fiber only.

4. The optical fiber transmission link of claim 1, wherein the length of the link length is greater than 8 km.

5. The optical fiber transmission link of claim 1, wherein the minimum allowable accumulated dispersion of the optical fiber transmission link is −58.7 ps/nm and the maximum allowable accumulated dispersion of the optical fiber transmission link is 33.1 ps/nm.

6. The optical fiber transmission link of claim 1, wherein the ratio of the length of the dispersion compensating fiber to the length of the single mode fiber is between 0.005 and 0.05.

7. The optical fiber of claim 1, wherein the dispersion compensating fiber exhibits a dispersion at 1265 nm of −150 ps/nm/km to −50 ps/nm/km.

8. The optical fiber of claim 1, wherein the dispersion compensating fiber exhibits a chromatic dispersion slope at 1265 nm of −2.6 ps/nm$^2$/km to −0.03 ps/nm$^2$/km.

9. The optical fiber of claim 1, wherein the dispersion compensating fiber exhibits a dispersion at 1290 nm of −250 ps/nm/km to −50 ps/nm/km.

10. The optical fiber of claim 1, wherein the dispersion compensating fiber exhibits a chromatic dispersion slope at 1290 nm of −5.5 ps/nm$^2$/km to −0.05 ps/nm$^2$/km.

11. The optical fiber of claim 1, wherein the dispersion compensating fiber exhibits a dispersion at 1310 nm of −375 ps/nm/km to −50 ps/nm/km.

12. The optical fiber of claim 1, wherein the dispersion compensating fiber exhibits a chromatic dispersion slope at 1310 nm of −6.5 ps/nm$^2$/km to −0.01 ps/nm$^2$/km.

13. The optical fiber of claim 1, wherein the dispersion compensating fiber exhibits a dispersion at 1330 nm of −460 ps/nm/km to −50 ps/nm/km.

14. The optical fiber of claim 1, wherein the dispersion compensating fiber exhibits a chromatic dispersion slope at 1330 nm of −9 ps/nm$^2$/km to −0.08 ps/nm$^2$/km.

15. The optical fiber of claim 1, wherein the dispersion compensating fiber exhibits a dispersion at 1350 nm of −550 ps/nm/km to −50 ps/nm/km.

16. The optical fiber of claim 1, wherein the dispersion compensating fiber exhibits a chromatic dispersion slope at 1350 nm of −7 ps/nm$^2$/km to −0.2 ps/nm$^2$/km.

17. The optical fiber of claim 1, wherein the dispersion compensating fiber exhibits a dispersion at 1375 nm of −425 ps/nm/km to −70 ps/nm/km.

18. The optical fiber of claim 1, wherein the dispersion compensating fiber exhibits a chromatic dispersion slope at 1375 nm of −11 ps/nm$^2$/km to −0.4 ps/nm$^2$/km.

19. A dispersion compensating module, comprising:
a winding spool,
a dispersion compensating fiber wound onto the winding spool, the dispersion compensating fiber including:
a central core region having an outer radius r1 of 1.5 μm to 2 μm, and a maximum refractive index Δ1 of 1.15% to 1.6%, and
a cladding region comprising (i) a first inner cladding (trench) region, surrounding the central core, having a refractive index Δ2 of −0.3% to −0.45% and an outer radius r2 of greater than 5 μm and less than or equal to 7 μm, (ii) a second inner cladding (ring) region, surrounding the first inner cladding region, having a refractive index Δ3 of 0.35% to 0.5% and a radius r3 of 6 μm to 8 μm, and (iii) an outer cladding region, surrounding the second inner cladding region, wherein the DCF exhibits a cable cutoff of less than 1260 nm and a mode field diameter at 1310 nm of greater than 4 microns.

20. An optical transmission system, comprising:
a transmitter
a receiver;
an optical fiber transmission link optically coupling the receiver and the transmitter; wherein the optical fiber transmission link comprises a length of single mode fiber and a dispersion compensating module coupled to the length of single mode fiber, wherein the dispersion compensating module comprises:
a winding spool,
a dispersion compensating fiber wound onto the winding spool, the dispersion compensating fiber comprising:
a central core region having an outer radius r1 of 1.5 μm to 2 μm, and a maximum refractive index Δ1 of greater than or equal to 1.15% and less than 1.6%, and
a cladding region comprising (i) a first inner cladding (trench) region, surrounding the central core, having a refractive index Δ2 of −0.3% to −0.45% and an outer radius r2 of greater than 5 μm and less than or equal to 7 μm, (ii) a second inner cladding (ring) region, surrounding the first inner cladding region, having a refractive index Δ3 of 0.35% to 0.5% and a radius r3 of 6 μm to 8 μm, and (iii) an outer cladding region, surrounding the second inner cladding region,
wherein the DCF exhibits a cable cutoff of less than 1260 nm and a mode field diameter at 1310 nm of greater than 4 microns, and
wherein the optical fiber transmission link comprising the dispersion compensating fiber coupled to the single-mode fiber and operating at wavelengths between 1265 nm and 1375 nm increases maximum link lengths of the optical fiber transmission link by more than 60% as compared to the link length of the optical fiber transmission link with the single-mode fiber only, and
wherein the maximum link length is calculated from the maximum allowed positive and negative accumulated dispersion at wavelengths between 1265 nm and 1375 nm.

\* \* \* \* \*